Aug. 21, 1951     J. C. KREJCI     2,564,700
PRODUCTION OF CARBON BLACK
Filed April 25, 1947

INVENTOR.
J. C. KREJCI
BY
Hudson and Young
ATTORNEYS

Patented Aug. 21, 1951

2,564,700

UNITED STATES PATENT OFFICE 2,564,700

PRODUCTION OF CARBON BLACK

Joseph C. Krejci, Phillips, Tex., assignor to Phillips Petroleum Company, a corporation of Delaware Application April 25, 1947, Serial No. 743,893

29 Claims. (Cl. 23—209.4)

This invention relates to a method of making carbon black and to an apparatus for the manufacture of carbon black. In one of its more specific aspects it relates to a method of making carbon black by, and to an apparatus for the manufacture of carbon black by the decomposition of hydrocarbons by contact with hot combustion gases.

This application is a continuation-in-part of my copending application, Serial No. 571,655, filed January 6, 1945, now abandoned, which copending application in turn is a division of my Patent No. 2,375,795, patented May 15, 1945. Applications, Serial Nos. 743,891 now forfeited and 743,892 now abandoned, filed April 25, 1947, disclose subject matter related to this application.

At the present time, most of the carbon blacks of commerce are produced by a very few processes and these blacks may be grouped into classes depending upon the types of rubber compound and vulcanized rubber which the carbon blacks will produce. A soft carbon black as compared to a hard carbon black is one which when mixed in a conventional rubber compound and the compound vulcanized yields a rubber which is softer, more resilient, more rubbery and yet tough whereas a hard carbon black in the same compound imparts stiffer, tougher characteristics, with lower resilience to the vulcanized rubber.

These two types of carbon black may be considered essentially as "limits" and many of the carbon blacks produced will possess hardness properties intermediate these above limits.

The commercial "channel" process produces a hard type carbon black which is especially good for compounding automotive tire tread stocks that withstand abrasion and possess good physical test properties. However, the yield of carbon by this process is only about 3.5% of the carbon content of the gas from which it is made. Some other carbon black processes give higher yields of carbon than the channel process, but in essentially all cases these blacks are of a softer type and less desirable for use in good quality tire tread stocks. These latter blacks, however, find other and varied uses, which are minor as compared to the relatively large amounts of hard channel black which go into tires at the present time, and a process which would give a high yield of a hard black similar to channel black in properties, would be most desirable.

An important object of this invention is to provide an apparatus and a process for producing carbon black of greater hardness and reinforcing value, comparable to or even superior in these respects to the present day "channel black."

Another object of this invention is to improve on the present day art of producing such carbon black by providing an apparatus and a process which will produce this superior carbon black out of contact with solid surfaces without depending on maintenance of streamline flow conditions as in some other processes, and with an extremely short reaction time.

Still another object of this invention is to provide a process for producing from hydrocarbons high yields of carbon black of high reinforcing value out of contact with solid surfaces without depending on maintenance of streamline flow conditions as in some other process and with an extremely short reaction time.

And still another object of my invention is to provide an apparatus, specifically a furnace structure, of such design that a greater quantity of carbon black of superior reinforcing value for the size of the furnace can be produced than in furnaces of conventional design now in use.

Yet another object of my invention is to provide a method for the operation of a furnace of such a design so as to obtain exceptionally high production rates of black having an abnormally high rubber reinforcing value.

Numerous other objects and advantages will be apparent to those skilled in the art upon reading the accompanying specification, claims and drawing.

The accompanying diagrammatic drawing is a part of this specification and illustrates a preferred form of the apparatus in which to practice the process of my invention.

Like numerals on the figures refer to like parts. The drawing is herein presented in diagrammatic form only, and such member parts as feed lines, air carrying pipes, combustible gas pipes, pumps, valves, meters, pressure regulators, pressure measuring devices, temperature measuring devices, and other conventional apparatus are not shown for purposes of simplicity. The quenching and cooling means, and the carbon black separating means are described in some more detail, yet more or less broadly, in U. S. Patents 2,375,796, 2,375,797 and 2,375,798, patented May 15, 1945.

According to this invention, carbon black is produced by an improved process using a reaction system of two cylindrical sections, one short section of large diameter, referred to hereinafter as the "combustion section," and, an elongated coaxial section of considerably smaller diameter, referred to hereinafter as the "reaction section." Broadly, the operation comprises passing a hydrocarbon, termed "reactant hydrocarbon," for conversion to carbon black axially into the combustion section and thence into the reaction section of the furnace. An inflammable mixture of air and fuel gas is introduced into the combustion section in a direction tangent to its cylindrical side wall and the mixture is burned to combustion gases before it comes in contact with the carbon black producing or reactant hydrocarbon at the axis of the chamber. By combustion gases is meant such gases as result from the chemical reactions of burning under the particular circumstances. The combustion gases and the reactant hydrocarbon then pass through the reaction section in a state of sufficient annular separation to prevent carbon deposition on the cylindrical walls thereof. The tangentially added mixture is injected at sufficient velocity to flow spirally inward in the combustion section and substantially helically through the reaction section. These gases are intended to have sufficient centrifugal force to maintain a layer of the combustion gas adjacent the reaction chamber wall and accordingly prevent deposition of carbon upon this wall. The reactant hydrocarbon is converted or decomposed to carbon black by heat transferred to it by mixing at the interface between the hydrocarbon and the combustion gases and/or by radiation. Upon issuing from the reactor, the gaseous effluent carrying the carbon black is cooled, and the carbon black separated therefrom by any usual means old in the art, such as running the effluent through bags to screen out the carbon black, or as now preferred running the effluent through an electrical precipitator and/or cyclone separators. When excess air is used in the tangentially introduced mixture, this excess air supports combustion of a portion of the hydrocarbon feed added axially and under such conditions, the heat evolved from this combustion is adsorbed by the endothermic reaction of hydrocarbon to carbon and in increasing the temperature of the reacting and reaction materials.

Referring now to the drawing which illustrates one form of apparatus in which the process of my invention may be practiced, the cylindrical reaction chamber 10 has a lining 11 of highly refractory material such as sillimanite, alumina or other refractory suitable for the purpose at hand. Between this refractory liner 11 and a cylindrical steel shell 13 is a layer of insulation 12. At the upstream end of this chamber is a short cylindrical section 14 of rather large diameter which may be called a "combustion" zone. This section has a refractory lining 11, which is in fact a continuation of the lining 11 from the reaction zone 10. The insulation material 12 also extends around this upstream section between its liner and the steel shell 13. At the outlet end of the furnace is a cooler assembly 42, a conduit-cooler 48, and a carbon black separating or recovery means 49.

In one furnace which I have used, the combustion zone 14 was 33 inches in diameter and 12 inches long, while the reaction zone 10 was 15 inches in diameter and 11 feet long. In another furnace having a 33 inch by 12 inch combustion section, the reaction zone was 12 inches in diameter by 11 feet long. These dimensions are given merely as examples, and any or all dimensions may be varied as desired. In modifying the furnace design, it is necessary however, to make certain that the combustion chamber has a relatively large diameter in comparison to its length, while the reverse is true for the reaction zone.

In the upstream or inlet end wall of the combustion zone 14 of the furnace is a feed pipe 16 arranged axially so that feed introduced therethrough will pass axially through the furnace. Surrounding this feed pipe 16 (Figures 2 and 5) is a larger pipe 17, called an "airjacket." The arrangement of these two pipes, 16 and 17, defines an annular space 18 through which it is intended to pass air into the furnace. Air passing through this annular space 18 is intended to keep the inner end of the feed tube cool to prevent the deposition of carbon thereon. Of course, if some carbon does deposit on the inner end of the feed tube this "air jacket" or "annulus" air will assist in its removal by combustion. But this annulus air is not essential to the process.

In the combustion zone 14 are arranged some inlets 15 (Figures 1 and 3) which are so disposed that gas passing therethrough and into the combustion zone will do so in a direction tangent to the cylindrical wall. Each tangential gas inlet 15 consists of a small conduit 21 (Figure 1), joining a larger conduit or tunnel 22, which latter terminates as an opening in the refractory liner 11 of the combustion chamber wall. A pipe 20 extends part way into the small conduit 21, as shown. As mentioned hereinbefore, this gas inlet assembly is so arranged that gas entering the combustion chamber therethrough does so in a direction tangent to the cylindrical wall at its point of inlet.

The tangential fuel inlets 15 used in tests described hereinafter in Tables I and II, are those illustrated in Figure 3 of the drawing. This assembly differs from that shown in Figure 1 in that the fuel conduit 26 extends about half way through the enlargement 22. Through this burner assembly is passed a combustible mixture of fuel gas, such as natural gas, and an oxygen containing gas, such as air. This combustible mixture is intended to begin burning as soon as it leaves the inner end of the conduit tubes 26. Burning gas and flame, and air, and hot products of combustion then flow circumferentially around the wall of the combustion zone 14. Upon continued injection of the combustible fuel mixture, the flame and combustion products follow a spiral path until the diameter of the spiral becomes less than the diameter of the reaction zone 10. By this time it is intended that substantially all of the gaseous fuel has been consumed, and the hot combustion products then follow a helical path adjacent the cylindrical wall through the reaction zone. In the case where there is more fuel than the stoichiometric proportion it is burned to carbon monoxide, carbon dioxide and water and the conditions of relatively low pressure and relatively high temperature in the furnace are such that the carbon in these combustion products is probably unavailable for conversion into carbon black. Passage of these combustion gases through the reaction zone is caused by the continuous addition of more fuel gas and air through the tangential burners 15 and the only opening for exit is the open downstream end of the furnace.

The tangential openings 22 are extended substantially from the shell of the furnace through the insulation and terminate in the periphery of the combustion section. The positioning of these fuel inlets is so intended that gaseous fuel passing therethrough enters the combustion zone in a direction substantially tangent to the circular walls. The fuel, also, is forced through the inlet tube 26 (Figure 1) at sufficient velocity that the fuel as it burns is maintained by centrifugal force adjacent the walls of the combustion zone. As fuel is added, the swirling flame and combustion products travel in a spiral path until the diameter of the spiral is about equal or some smaller than the diameter of the reaction zone 10, when, as mentioned hereinbefore, the rotating gases pass helically through this latter zone. In the operation of my furnace it is intended that the combustible gas be substantially completely burned by the time the gases enter the reaction zone 10 or by the time it contacts the reactant hydrocarbon added through the feed tube 16.

The effluent gases and suspended carbon black issuing from the outlet end of the reactor chamber 10 pass directly into a chiller assembly which consists of a water jacketed cooler 42 and a water sprayer 46. The inside diameter of this jacket assembly may be substantially the same as the diameter of the reactor chamber 10 so as not to interfere with the helical movement of the blanketing material between the central core products and the reactor walls 11. In this manner the metal walls of the cooler are maintained substantially free of carbon. Pipe 44 conducts cooling water from a source, not shown, to the water jacket, the water passing through the space 43 and out through the outlet pipe 45 to such disposal as desired. Pipe 47 conducts water from a source, not shown, to the spray nozzle 46. From this water cooling zone, the gases and carbon black pass through pipe 48 to a carbon black separating means 49. Pipe 48 may be a long pipe intended to serve as an auxiliary cooler as well as a conduit. When this pipe serves as a cooler, transferring heat from its interior to the atmosphere, the amount of spray water may be greatly reduced. This operation also reduces the load on the separating system 49. Gas from which carbon black has been removed issues from the separator through pipe 50 while the carbon black passes through outlet pipe 51 to such disposal or further treatment as desired.

I will hereinafter describe the production of a superior carbon black in my unique furnace using an oil feed having the following characteristics:

A. S. T. M. distillation

| | | |
|---|---|---|
| First drop | °F | 420 |
| 5% | °F | 449 |
| 10% | °F | 457 |
| 20% | °F | 466 |
| 30% | °F | 474 |
| 40% | °F | 484 |
| 50% | °F | 490 |
| 60% | °F | 506 |
| 70% | °F | 524 |
| 80% | °F | 560 |
| 90% | °F | 630 |
| End point | °F | 672 |
| Recovery | percent | 96 |
| Pour point | °F | −40 |
| Carbon residue (Conradson) | weight percent | 0.20 |
| Gravity, A. P. I. | degrees | 19.7 |
| Aniline No | °F | 31.8 |
| Flash, (P. M.) | °F | 200 |
| Refractive index | | 1.5342 |

In the operation of my furnace for the manufacture of highly reinforcing carbon black, with the heavy hydrocarbon oil, described above, as the source of the carbon, the oil feed is preheated to about 675° F. and introduced at this temperature through the tube 16 into the combustion end of the furnace. This tube 16 may be at 1 inch I. D. tube centered in a 1½ inch I. D. air jacket tube 17. Air is added to the furnace through the annulus 18 at the rate of about 4000 cubic feet per hour. However, the volume of air so added may be varied as desired, the important point being to maintain the discharge end of the tubes 16 and 17 sufficiently cool to prevent deposition of carbon thereon or in case some carbon is formed, the air is intended to remove the carbon by combustion.

In the examples given hereinafter, the tangential fuel inlet assembly of Figure 3 was used. The openings 22 were 6 inches in diameter and the tubes 26 extended about half way through the openings 22 as shown. Tubes (26) of different diameters were used ranging from the smallest of 2.62 inches, the intermediate of 3.35 inches, to the largest, which was 5 inches.

The following is an analysis of the tangentially injected fuel gas:

| | Gas volume percent |
|---|---|
| $N_2$ | 8.14 |
| $C_1$ | 82.53 |
| $C_2$ | 5.75 |
| $C_3$ | 2.99 |
| $C_4$ | 0.55 |
| $C_5$ | 0.04 |

$N_2$ is nitrogen and $C_1$, $C_2$, etc. are hydrocarbons having 1, 2, etc. carbon atoms per molecule.

This fuel gas and air was mixed in the proportions given in the following tabulation and the resulting combustible mixture injected through the tangential inlets 15 at a velocity greater than the rate of flame propagation. By this rapid rate of fuel mixture injection the danger of an explosion in the fuel lines was averted.

In the following examples, the oil feed was preheated to 675° F., the jacket or annulus air was fed at the rate of 4000 cubic feet per hour, and the effluent from the reactor was quenched with water to about 1250° F. immediately upon leaving the reactor. Temperature in the combustion chamber in all runs was about 3000° F. and in the reaction zone was about 2600° F.

The combustion chamber 14 was 33 inches in diameter by 12 inches long; the reaction zone 10 was 15 inches in diameter by 11 feet long.

*Table I*

| Run No. | Tangential fuel tube (26) diam. in inches | Oil feed rate, gals. per hr. | Tangential air, cu. ft. per hr. | Tangential fuel gas, cu. ft. per hr. | Tangential air: gas ratio | Carbon Black yield, lbs. per gal. oil |
|---|---|---|---|---|---|---|
| P2 | 2.62 | 50 | 40,000 | 4,520 | 8.9 | 4.30 |
| P1 | 2.62 | 60 | 40,000 | 3,560 | 11.2 | 4.02 |
| P3 | 3.35 | 75 | 60,000 | 6,730 | 8.9 | 4.68 |
| P4 | 3.35 | 100 | 80,000 | 7,270 | 11.0 | 3.78 |
| P5 | 3.35 | 125 | 80,000 | 5,700 | 14.0 | 3.96 |
| P6 | 5.00 | 170 | 120,000 | 10,900 | 11.0 | 4.48 |
| P7 | 5.00 | 150 | 150,000 | 13,600 | 11.0 | 3.10 |
| P8 | 5.00 | 175 | 150,000 | 13,600 | 11.0 | 3.21 |

Samples of carbon black from the above mentioned P1 to P8 runs, inclusive, were made up in rubber compounds and vulcanized to finish rubber. The compounding formula used for this evaluation is a GR-S tread recipe and is as follows:

| | Parts by weight |
|---|---|
| GR-S | 100 |
| Zinc oxide | 3 |
| Carbon black | 50 |
| Asphalt #6 | 6 |
| Sulfur | 1.75 |
| Santocure | 0.8 |

These compounds were vulcanized at 307° F. for 30 minutes and after vulcanization possessed properties as given in Table II. However, the values reported in columns headed "Heat Buildup, °F.," "Resilience, percent," "Abrasion loss" and "Abrasion index" were obtained from samples compounded as above mentioned but were vulcanized for 45 minutes and the vulcanized samples aged for 24 hours at 212° F. prior to the determination of the heat buildup and resilience.

plement of the hysteresis loss, or more simply expressed, is a measure of the potential energy of a piece of rubber that is present as a result of applied stress and which is recoverable when the stress is removed. "Abrasion loss" may be defined as the loss of weight in grams of a test piece of rubber of standard size when exposed to standard abrasion conditions.

The abrasion index is included in Table II since the loss in grams for a standard varies from group to group. In Table II a rubber made from an F81 sample of black was taken as a standard and rubbers made with other samples of black compared to it, for example, the F81 sample had an abrasion loss of 2.32 grams, while the P2 sample lost 3.90 grams.

$$100 \times (2.32 \text{ divided by } 3.90) = 59.5$$

The P2 sample was inferior to the F81 sample since it lost more grams of rubber during the abrasion test, and the ratio is taken so that the 2.32 is in the numerator, and the quotient then of $2.32/3.90 \times 100$ will equal a value less than 100, the abrasion index for the F81 sample.

The F81 sample was taken as the abrasion index standard since this sample was one of the most reinforcing carbon blacks produced by a furnace method, on a basis of abrasion loss.

Runs were made using reactor systems of some-

*Table II*

| Sample No. | Test samples vulcanized 30 minutes | | | Test samples vulcanized 45 minutes, then aged 24 hours at 212° F. | | | |
|---|---|---|---|---|---|---|---|
| | 300% Modulus, p.s.i. | Tensile Strength, p.s.i. | Elongation at break, per cent | Heat Buildup, °F. | Resilience, per cent | Abrasion Loss, gm. | Abrasion Index, F81-100 |
| P2 | 1,380 | 2,670 | 480 | 80.7 | 61.5 | 3.90 | 59.5 |
| P1 | 1,540 | 2,800 | 483 | 84.7 | 60.5 | 3.47 | 66.8 |
| P3 | 1,530 | 3,080 | 510 | 84.7 | 60.5 | 3.09 | 75.0 |
| P4 | 1,630 | 2,600 | 420 | 86.3 | 59.7 | 2.49 | 93.2 |
| P5 | 1,800 | 2,940 | 450 | 86.3 | 59.7 | 2.38 | 97.3 |
| P6 | 1,580 | 2,400 | 410 | 88.0 | 59.5 | 2.63 | 89.2 |
| P7 | 1,740 | 2,860 | 438 | 94.0 | 57.5 | 2.05 | 113.2 |
| P8 | 1,770 | 2,840 | 433 | 92.7 | 57.7 | 1.96 | 118.4 |
| F81 | 1,860 | 2,870 | 443 | 89.7 | 58.7 | 2.32 | 100.0 |

In Tables II, IV and V the term "300% Modulus, p. s. i." refers to the pounds per square inch pull in a tension test when the test piece of vulcanized rubber has been stretched 300% of the length of the original test piece. The "Tensile Strength, p. s. i." column represents the pounds per square inch pull at the point of rupture or break of the test piece undergoing the above mentioned 300% modulus test. The "Elongation" column represents the stretch or elongation at the point of "break." "Heat Buildup" as used herein may be defined as the temperature rise in degrees F. above 100° F. of a sample of rubber of standard size when exposed to rapid flexing under standardized conditions. The "Resilience" is the comwhat different dimensions than those used in making the blacks listed in Tables I and II.

The data given in Table III, below, is the operating data obtained in making carbon black in a furnace in which the combustion chamber was 33 inches in diameter and 12 inches long, that is, similar to the one mentioned hereinbefore. The reactor, however, is 12 inches in diameter by 11 feet in length. The tangential fuel inlets (15) of Figure 1 were used in this series of tests and consisted of a short hole 21, about 4 inches in diameter, followed by a longer hole 22, about 8 inches in diameter and 14 inches long on its short side. A metal tube 20 was about 3.7 inches inside diameter and was inserted into the 4 inch hole 21 to within about 2 inches of the beginning of the 8 inch section. This entire assembly was so arranged that gaseous fuel passing therethrough entered the combustion zone in a direction tangent to its circular wall. Combustion was intended to begin in the 8 inch diameter section. This reactor was lined with 90% alumina brick which gave satisfactory service.

The composition of the oil feed and residue gas, the oil preheat temperature, the size of the oil inlet tube and air jacket, the jacket air rate, and the method of quenching the reactor effluent were the same as in the runs of Table I.

*Table III*

| Run No. | Oil Feed Rate, gals. per hr. | Tangential air, cu. ft. per hr. | Tangential fuel gas, cu. ft. per hr. | Air to gas Ratio | Carbon Black yield, lbs. per gal. | Temp. ° F. in Combustion Chamber |
|---|---|---|---|---|---|---|
| P10 | 100 | 100,000 | 9,100 | 11 | 3.16 | 3,000-3,100 |
| P11 | 115 | 100,000 | 9,100 | 11 | 3.47 | 3,000-3,100 |
| P13 | 122 | 100,000 | 9,100 | 11 | 3.95 | 3,000-3,100 |
| P14 | 75 | 75,000 | 6,800 | 11 | 2.63 | 3,000-3,100 |
| P15 | 85 | 75,000 | 6,800 | 11 | 3.50 | 3,000-3,100 |
| P16 | 110 | 75,000 | 6,800 | 11 | 4.13 | 3,000-3,100 |
| P17 | 120 | 100,000 | 10,000 | 10 | 4.56 | 3,000-3,100 |
| P19 | 130 | 100,000 | 8,350 | 12 | 3.87 | 2,930 |
| P21 | 130 | 100,000 | 7,700 | 13 | 3.50 | 2,850 |
| P23 | 130 | 100,000 | 7,150 | 14 | 3.54 | 2,700 |
| P25 | 130 | 100,000 | 6,660 | 15 | 3.22 | 2,600 |
| P27 | 130 | 100,000 | 6,250 | 16 | 2.87 | 2,600 |
| P20 | 140 | 100,000 | 8,350 | 12 | 4.20 | 2,930 |
| P22 | 140 | 100,000 | 7,700 | 13 | 3.92 | 2,850 |
| P24 | 150 | 100,000 | 7,150 | 14 | 3.86 | 2,700 |
| P26 | 155 | 100,000 | 6,660 | 15 | 3.72 | 2,600 |
| P28 | 165 | 100,000 | 6,250 | 16 | 3.75 | 2,600 |

The carbon black samples prepared in the tests reported in Table III were compounded according to the same rubber formula as given hereinbefore and the compounds vulcanized at 307° F. for 45 minutes and the properties of the resulting rubbers are given in Table IV.

*Table IV—45 minute vulcanization*

| Sample No. | 300% Modulus, p. s. i. | Tensile Strength, p. s. i. | Elongation at break, per cent | Heat Build-up, ° F. | Resilience, per cent | Abrasion Loss, gm. | Abrasion Index F81-100 |
|---|---|---|---|---|---|---|---|
| P10 | 1,430 | 2,970 | 480 | 87.0 | 59.5 | 1.91 | 72.0 |
| P11 | 1,740 | 3,300 | 455 | 88.0 | 58.3 | 1.30 | 106.0 |
| P13 | 1,680 | 3,320 | 465 | 84.3 | 58.3 | 1.27 | 108.4 |
| P14 | 1,720 | 3,200 | 450 | 90.0 | 57.1 | 1.34 | 102.8 |
| P15 | 1,730 | 3,230 | 455 | 87.9 | 58.5 | 1.41 | 97.7 |
| P16 | 1,870 | 3,140 | 435 | 89.2 | 59.3 | 1.46 | 94.3 |
| P17 | 1,940 | 3,090 | 428 | 88.1 | 58.7 | 1.25 | 110.0 |
| P19 | 1,720 | 3,110 | 443 | 86.3 | 58.8 | 1.62 | 111.3 |
| P21 | 1,830 | 3,120 | 435 | 86.3 | 58.4 | 1.63 | 110.5 |
| P23 | 1,890 | 3,060 | 425 | 90.8 | 57.4 | 1.52 | 118.5 |
| P25 | 1,720 | 3,230 | 460 | 91.5 | 57.2 | 1.52 | 118.5 |
| P27 | 1,800 | 2,970 | 430 | 90.0 | 58.4 | 1.63 | 110.5 |
| P20 | 1,900 | 2,960 | 423 | 89.2 | 58.2 | 1.76 | 102.4 |
| P22 | 1,790 | 3,150 | 438 | 90.9 | 57.5 | 1.53 | 117.6 |
| P24 | 1,800 | 3,000 | 420 | 89.0 | 57.8 | 1.59 | 113.2 |
| P26 | 1,580 | 2,860 | 410 | 86.2 | 58.3 | 1.76 | 102.4 |
| P28 | 1,930 | 2,920 | 410 | 89.5 | 58.0 | 1.49 | 121.0 |

It should be noted that all the carbon black samples tested and reported in Table IV excepting three (P10, P15 and P16) are more highly reinforcing than the F81 carbon black when considered on the basis of abrasion loss.

No carbon deposits formed on the walls of the reactor 10 in any of the carbon black producing runs described herein. The helically moving layer of hot combustion gas was an efficient means for keeping the carbon producing zone out of contact with the walls of the reactor portion of the apparatus.

All yields of carbon black given in Tables I and III are based on the oil used with no allowance for the residue gas injected through the tangential ports in the combustion section of the furnace. As mentioned hereinbefore, this residue gas is intended to be completely or substantially completely burned prior to contact with reactant hydrocarbon oil vapors in the central or axial portion of the combustion zone.

The theoretical ratio of air to gas in the tangentially injected fuel mixture is 10. Runs were made with this ratio varying from less than 10 to 16. One run was made using an air to gas ratio of 9 (rich in gas), but no sample of carbon black was collected, although operation of the furnace was satisfactory. Two runs, P2 and P3 (Table I) were made using an air to gas ratio of 8.9. In these two runs the yield of black was high but the quality of the black when considered from the point of view of their rubber reinforcing value (abrasion loss) was not especially good.

This ratio can be anywhere substantially within the inflammable limits of the particular fuel used. It is, however, necessary that the mixture be within the inflammable limits, as otherwise the fuel would not be burned before contacting the oil feed in the combustion chamber. As the air to gas ratio was increased from 10 to 14 in Table I, and from 10 to 16 in Table III, the quality of the products remained about the same, but as would be expected, the yield decreased slightly. The higher the ratios above 10, the lower were the operating temperatures, the action of which was less detrimental and destructive to materials of construction.

Figures 1, 2, 3, 4, 5:
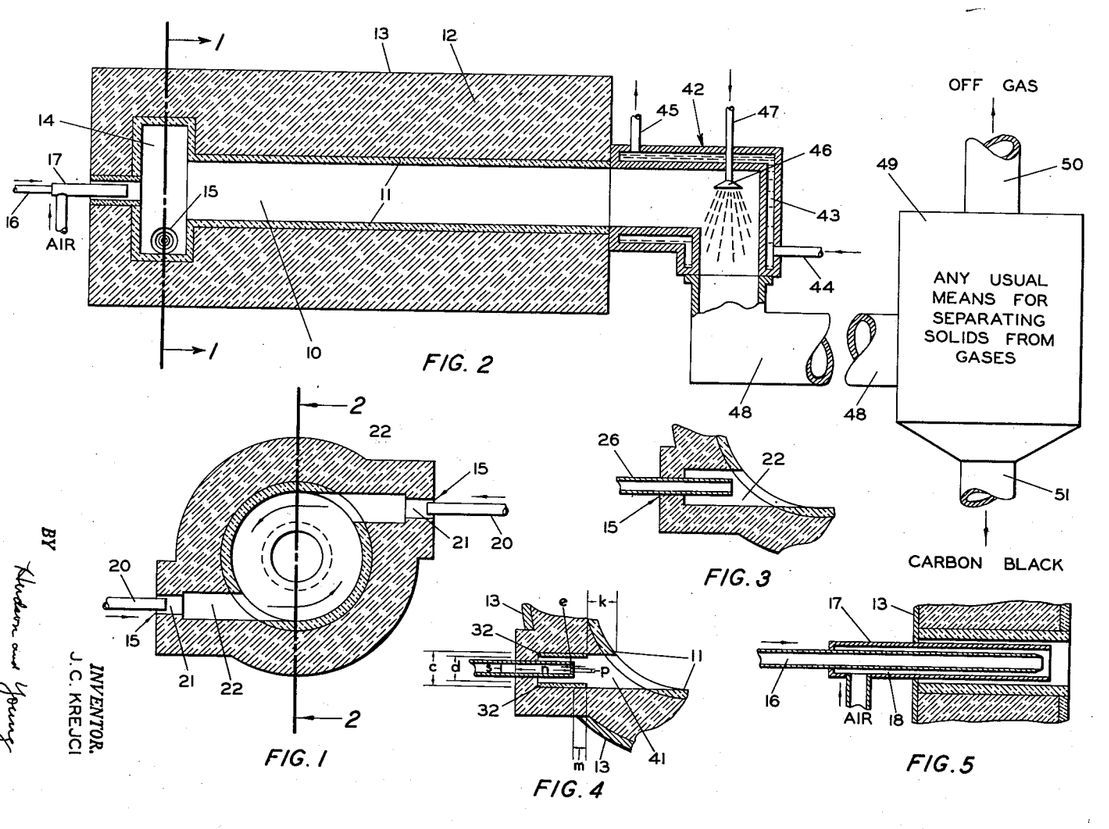
Figure 1 is a transverse sectional view of a furnace embodying my invention and taken on the line 1—1 of Figure 2.
Figure 2 is a longitudinal sectional view of the same furnace taken on the line 2—2 of Figure 1.
Figure 3 is a transverse sectional view of a modified furnace embodying my invention having a second form of tangential fuel injection assembly.
Figure 4 is a view similar to Figure 3 showing a third form of the tangential fuel injection assembly.
Figure 5 is an enlarged view of a portion of Figure 2 showing the reaction hydrocarbon inlet tube 16 and related parts in greater detail.

The combustion of the tangentially injected fuel during operation begins well within the tunnel 22 and at a point rather close to the outlet end of the fuel injection pipe 26 of Figure 3, or close to the outlet end of the restricted section 21 when the tangential port assembly of Figure 1 is used. Combustion of a portion of the tangentially added fuel gas in this tunnel 22 is a preferred method of operation since a steadier flame can be maintained in this manner. However, this is not an essential part of the process since all of the combustion can be carried out inside of the 33 inch combustion chamber and before any mixing with the oil feed vapors occurs. Also in some commercial operations of the process the temperature in space 14 indicates that the combustion of fuel from pipe 20 possibly is completed by the time it emerges out of tunnel 22 into space 14.

The substantial separation of the heat furnishing combustion reactions and the carbon forming reactions in space has solved the combustion problem encountered in some conventional carbon black furnace processes at high throughputs. In my furnace the combustion was smooth in all of the runs reported herein, and no indications were apparent that combustion would not have been good at even higher oil throughputs.

Figure 4 illustrates diagrammatically an alternate form of burner assembly for use in injection of a combustible fuel-air mixture tangentially into the combustion chamber 14. When using a burner nozzle of this type the tunnel 41 extends from the combustion chamber 14 for quite some distance. If desired, the tunnel 41 may extend entirely through the furnace insulation or may terminate at about such a point as illustrated in Figure 4. The tunnel may be lined with a refractory tube 32. The dimension K in this form of burner was 14 inches, $c$ was 8 inches, $d$ was 6 inches, $p$ was 3½ inches, $e$ was ¼ inch, $m$ was 3 inches, $n$ was 4¾ inches and $s$ was 5½ inches. The burner tube may be made of an 18-8 stainless steel, 27 Cr or 25-20 stainless steel or any other metal or alloy which is suitable under the conditions encountered in such an installation. The dimensions given for the burner assembly of Figure 4 are intended to be exemplary and may be varied as desired within certain limits as will be recognized by those skilled in the art.

When a gas which is substantially all methane is used as the tangential fuel gas the ratio of air added tangentially along with this fuel gas should be between about 6.6 and about 20 volumes of air per volume of gas in order to make the furnace operative to produce carbon black. Much better results are generally obtained when the air ratio is between about 9 and about 16.5 volumes per volume of gas, and such ratios are preferred. In many furnaces an air ratio of about 15 volumes of air per volume of gas is optimum, as to proceed from 15 volumes toward 10 volumes of air per volume of gas results in a tendency toward greater heating than desirable, while more than 16.5 volumes of air per volume of gas tends to cause destructive vibration.

Hydrocarbon oils as a spray or vapor or gases other than methane, or other hydrocarbon oils and/or gases mixed with methane or even powdered solid fuels may be used as the tangential fuel in the herein disclosed process, but fluids are preferred. Such fuels which are richer in combustible material per unit of volume than methane require a larger proportion of air for combustion. Water gas, producer gas, coal gas, or even hydrogen could be used but are not preferred. One skilled in the art can easily determine or calculate the proportion of air necessary for the combustion of such a gas when the composition of the mixture is known. Once the theoretical air-to-gas ratio is determined the best operating limits can then be determined. The upper limit can be determined merely by increasing the proportion of air until a tendency to backfire or to knock is observed and the lower limit may then be found by decreasing the air from that amount causing knocking until a tendency to overheat the furnace is observed.

My process is not intended to be limited to the use of a degraded recycle gas oil, as hereinbefore described, as the carbon containing feed stock. Other oils, such as kerosene, gasoline boiling range hydrocarbons, heavy or light naphthas or oils even heavier than degraded recycle gas oils may be used. Such hydrocarbon materials as natural gas, either dry gas, wet or raw natural gas as it comes from a gas well, or gasoline extraction plant or refinery residue gas may be used. Further, heavier hydrocarbons than normally gases may be used as charge, such as butane, pentane or the like. Broadly, most any hydrocarbon can be used as feed in my furnace. The feed may be injected as a liquid through a spray or atomizer, although I prefer to operate with the feed injected as a vapor. Hydrocarbons from other sources than petroleum likewise are suitable, as for example, low temperature coal gas, coal tar distillates, shale gases and distillates may be used. These charge stocks may contain most any class of hydrocarbon compound, as for example, saturated or unsaturated hydrocarbons, paraffins, olefins, aromatics, naphthenes or any others which might become available. A gas oil such as that hereinbefore described is, however, a preferred feed stock. Best results in producing the very highest quality carbon black are obtained with an aromatic gas oil of the type described above in the example as the reactant axial feed, which gas oils have an aniline number of 31.8° F. or less, but the rubber reinforcing properties of the carbon black are substantially uneffected by using a higher aniline number less aromatic gas oil up to 150° F. aniline number, or even higher depending on the oil. For some gas oils at about 134° F. to 146° F. aniline number a slight roughness in the extrusion of rubber containing the carbon black became noticeable, while in other gas oils this effect is noticeable only above 180° F. aniline number. A more noticeable change is that as the aniline number goes down, the yield in pounds of carbon black per gallon of oil increases, but this is expected as aromatic compounds have a greater proportion of carbon atoms than paraffinic compounds. However, when using any hydrocarbon, the rubber reinforcement properties are greater and the abrasion losses of the rubber are lower when the carbon black is made by operating according to the present method than when operating according to the prior art.

Materials of construction, as for example, preheat furnace tubes, reaction chamber insulation and lining, etc., may be selected from among those items commercially available and best suited to the operating conditions as herein disclosed without departing from the scope of my invention.

While the preferred apparatus and method of operation for carrying out my invention are described in this specification, it will be obvious to those skilled in the art that there may be many possible variations of the apparatus and methods of operation as may be learned from

I claim:

1. A process for producing carbon black having high reinforcing properties in rubber similar to those of channel black which comprises establishing in a generally cylindrical first zone having a diameter greater than its length a rotating mass of hot combustion gases by injecting thereinto previously produced hot combustion gases, continuously injecting additional hot combustion gases to said rotating mass to maintain a temperature above approximately 2600° F. in said first cylindrical zone, continuously passing a portion of said gases while so rotating into a generally cylindrical second zone the length of which is greater than its diameter and the diameter of which is less than that of said first zone, said second zone being in communication with and in axial alignment with said first zone whereby a helical movement of said gases is provided along the inner surface of said second zone, introducing a vaporous hydrocarbon along the axis of said first zone and passing it axially through said rotating mass in said first zone and axially into the center of said helically moving gases in said second zone, forming carbon black from said vaporous hydrocarbon by pyrochemical action due to the heat of the surrounding hot combustion gases without the further addition of any substantial amount of air, and separating said carbon black from the resultant gaseous products of said process.

2. The process of claim 1 in which the vaporous hydrocarbon is a gas oil comprising aromatic hydrocarbons.

3. The process of claim 1 in which the vaporous hydrocarbon is a gas oil comprising aromatic hydrocarbons, and the rotating mass of hot combustion gases is formed by combustion of a normally gaseous hydrocarbon with air.

4. The process of claim 1 in which the vaporous hydrocarbon is a gas oil comprising aromatic hydrocarbons, and the rotating mass of hot combustion gases is formed by combustion of a normally liquid hydrocarbon.

5. The process of claim 1 in which the vaporous hydrocarbon is a gas oil comprising aromatic hydrocarbons, and the rotating mass of hot combustion gases is formed by combustion of a fuel comprising over 50 per cent by volume methane.

6. A process for producing carbon black having high reinforcing properties in rubber similar to those of channel black which comprises continuously introducing burning fuel and free oxygen containing gas tangentially into a first cylindrical zone having a diameter greater than its length, burning said fuel completely before the resulting combustion gases leave that portion of said first zone adjacent the cylindrical wall thereof to maintain a temperature above approximately 2600° F. in said first cylindrical zone, passing said resulting combustion gases spirally inward toward the longitudinal axis of said first zone, continuously passing said gases while so rotating into a second cylindrical zone the length of which is greater than its diameter and the diameter of which is less than that of said first zone, said second zone being in communication with and in axial alignment with said first zone whereby a helical movement of said gases is provided along the inner surface of said second zone, introducing a vaporous hydrocarbon along the axis of said first zone and passing it axially through the center of said inwardly spirally combustion gases in said first zone and axially into the center of said helically moving gases in said second zone, forming carbon black in said vaporous hydrocarbon in said first and second zones by pyrochemical action due to the heat of the surrounding hot combustion gases without the further addition of any substantial amount of air, and separating said carbon black from the resultant gaseous products of said process.

7. The process of claim 6 in which the vaporous hydrocarbon is a gas oil comprising aromatic hydrocarbons.

8. The process of claim 6 in which the vaporous hydrocarbon is a gas oil comprising aromatic hydrocarbons, the fuel is a normally gaseous hydrocarbon, and the oxygen containing gas is air.

9. The process of claim 6 in which the vaporous hydrocarbon is a gas oil comprising aromatic hydrocarbons and the fuel is a normally liquid hydrocarbon.

10. The process of claim 6 in which the vaporous hydrocarbon is a gas oil comprising aromatic hydrocarbons, and the fuel is over 50 per cent by volume methane.

11. A process for producing carbon black having high reinforcing properties in rubber similar to those of channel black which comprises continuously introducing fuel and free oxygen containing gas into a preliminary burning zone, initiating the combustion of said fuel in said preliminary burning zone, passing burning fuel from said zone tangentially into a cylindrical first zone, burning said fuel completely at the latest before the resulting combustion gases leave the region adjacent the cylindrical wall of said first zone to maintain a temperature above approximately 2600° F. in said first cylindrical zone, passing said combustion gases spirally inward toward the longitudinal axis of said first zone to form a vortex, continuously passing said gases while so rotating into a cylindrical second zone the length of which is greater than its diameter and the diameter of which is less than that of said first zone, said second zone being in communication with and in axial alignment with said first zone whereby a helical movement of said gases is provided along the inner surface of said second zone, introducing a vaporous hydrocarbon along the axis of said first zone and passing it axially through the center of said inwardly spiralling combustion gases in said first zone and axially into the center of said helically moving gases in said second zone, forming carbon black in said vaporous hydrocarbon in said first and second zones by pyrochemical action due to the heat of the surrounding hot combustion gases without the further addition of any substantial amount of air, and separating said carbon black from the resultant gaseous products of said process.

12. The process of claim 11 in which the vaporous hydrocarbon is a gas oil comprising aromatic hydrocarbons.

13. The process of claim 11 in which the vaporous hydrocarbon is a gas oil comprising aromatic hydrocarbons, the fuel is a normally gaseous hydrocarbon, and the oxygen containing gas is air.

14. The process of claim 11 in which the vaporous hydrocarbon is a gas oil comprising aromatic hydrocarbons and the fuel is a normally liquid hydrocarbon.

15. The process of claim 11 in which the vaporous hydrocarbon is a gas oil comprising aromatic hydrocarbons, and the fuel is over 50 per cent by volume methane.

16. A process for producing carbon black having high reinforcing properties in rubber similar to those of channel black which comprises continuously introducing fuel and free oxygen containing gas tangentially into a first cylindrical zone having a diameter greater than its length, passing the resulting gases spirally inward toward the longitudinal axis of said first zone, continuously passing said gases while so rotating into a second cylindrical zone the length of which is greater than its diameter and the diameter of which is less than that of said first zone, said second zone being in communication with and in axial alignment with said first zone whereby a helical movement of said gases is provided along the inner surface of said second zone, introducing a vaporous hydrocarbon along the axis of said first zone and passing it axially through the center of said inwardly spiralling gases in said first zone and axially into the center of said helically moving gases in said second zone, burning said fuel with said free oxygen containing gas and substantially completing the combustion of said fuel before said inwardly spiraling resulting gases contact said axially passing vaporous hydrocarbon to maintain a temperature above approximately 2600° F. in said first cylindrical zone, forming carbon black from said vaporous hydrocarbon by pyrochemical action due to the heat of the surrounding hot combustion gases without the further addition of any substantial amount of air, and separating said carbon black from the resultant gaseous products of said process.

17. The process of claim 16 in which the vaporous hydrocarbon is a gas oil comprising aromatic hydrocarbons.

18. The process of claim 16 in which the vaporous hydrocarbon is a gas oil comprising aromatic hydrocarbons, and the fuel is over 50 per cent by volume methane.

19. The process of claim 16 in which the vaporous hydrocarbon is a gas oil comprising aromatic hydrocarbons, the fuel is a normally gaseous hydrocarbon, and the oxygen containing gas is air.

20. The process of claim 16 in which the vaporous hydrocarbon is a gas oil comprising aromatic hydrocarbons and the fuel is a normally liquid hydrocarbon.

21. A process for producing carbon black having high reinforcing properties in rubber similar to those of channel black which comprises continuously introducing fuel and free oxygen containing gas into a preliminary burning zone, initiating the combustion of said fuel in said preliminary burning zone, passing burning fuel from said zone tangentially into a cylindrical first zone, passing the resulting gases spirally inward toward the longitudinal axis of said first cylindrical zone to form a vortex, continuously passing said gases while so rotating into a cylindrical second zone the length of which is greater than its diameter and the diameter of which is less than that of said first zone, said second zone being in communication with and in axial alignment with said first zone whereby a helical movement of said gases is provided along the inner surface of said second zone, introducing a vaporous hydrocarbon along the axis of said first zone and passing it axially through the center of said inwardly spiralling gases in said first zone and axially into the center of said helically moving gases in said second zone, burning said fuel with said free oxygen containing gas and substantially completing the combustion of said fuel before said inwardly spiraling resulting gases contact said axially passing vaporous hydrocarbon to maintain a temperature above approximately 2600° F. in said first cylindrical zone, forming carbon black from said vaporous hydrocarbon by pyrochemical action due to the heat of the surrounding hot combustion gases without the further addition of any substantial amount of air, and separating said carbon black from the resultant gaseous products of said process.

22. The process of claim 21 in which the vaporous hydrocarbon is a gas oil comprising aromatic hydrocarbons.

23. The process of claim 21 in which the vaporous hydrocarbon is a gas oil comprising aromatic hydrocarbons, the fuel is a normally gaseous hydrocarbon, and the oxygen containing gas is air.

24. The process of claim 21 in which the vaporous hydrocarbon is a gas oil comprising aromatic hydrocarbons and the fuel is a normally liquid hydrocarbon.

25. The process of claim 21 in which the vaporous hydrocarbon is a gas oil comprising aromatic hydrocarbons, and the fuel is over 50 per cent by volume methane.

26. A process for producing carbon black having high reinforcing properties in rubber similar to those of channel black which comprises introducing a vaporous hydrocarbon into a round first zone having a diameter greater than its length, said introduction being along the axis of said first zone, establishing a mass of hot combustion gases, surrounding said vaporous hydrocarbon in said zone by injecting thereinto previously produced hot combustion gases, continuously injecting said hot combustion gases into said mass to maintain a temperature above approximately 2600° F. in said round first zone, continuously passing said vaporous hydrocarbons surrounded by said hot combustion gases axially into a round second zone the length of which is greater than its diameter and the diameter of which is less than that of said first zone, said second zone being in communication with and in axial alignment with said first zone, forming carbon black from said vaporous hydrocarbon by pyyro-chemical action due to the heat of the surrounding hot combustion gases without the further addition of any substantial amount of air, and separating said carbon black from the resultant gaseous products of said process.

27. A process for producing carbon black having high reinforcing properties in rubber similar to those of channel black which comprises introducing a vaporous hydrocarbon into a generally cylindrical first zone having a diameter greater than its length, said introduction being along the axis of said first zone, establishing and maintaining an inwardly spiralling, rotating mass of hot combustion gases surrounding said vaporous hydrocarbon in said first zone by continuously introducing hot combustion gases tangentially into the periphery of said rotating mass to maintain a temperature above approximately 2600° F. in said first cylindrical zone, continuously passing said vaporous hydrocarbon and the surrounding rotating hot combustion gases axially into a cylindrical second zone the length of which is greater than its diameter and the diameter of which is less than that of said first zone, said second zone being in communication with and in axial alignment with said first zone, completing the formation of carbon black in said second zone from said vaporous hydrocarbon by pyro-chemical action due to the heat of the surrounding hot combustion gases without the further addition of any substantial amount of air, and separating the carbon black from the resulting gaseous product of the process.

28. A process for producing carbon black having high reinforcing properties in rubber similar to those of channel black which comprises continuously introducing fuel and free oxygen containing gas into a preliminary burning zone, initiating the combustion of said fuel in said preliminary burning zone, passing burning fuel from said zone tangentially into a first cylindrical zone, burning said fuel completely at the latest before the resulting combustion gases leave the region adjacent the cylindrical wall of said first cylindrical zone to maintain a temperature above approximately 2600° F. in said first cylindrical zone, passing said combustion gases spirally inward toward the longitudinal axis of said first cylindrical zone to form a vortex, continuously passing said gases while so rotating into a second cylindrical zone the length of which is greater than its diameter and the radius of which is less than the radius of said first cylindrical zone by a distance greater than the radial extent of said tangential introduction of fuel into said first cylindrical zone, said second zone being in communication with and in axial alignment with said first cylindrical zone whereby a helical movement of said gases is provided along the inner surface of said second zone, introducing a vaporous hydrocarbon along the axis of said first cylindrical zone and passing it axially through the center of said inwardly spiralling combustion gases in said first cylindrical zone and axially into the center of said helically moving gases in said second zone, forming carbon black in said vaporous hydrocarbon in said first and second zones by pyro-chemical action due to the heat of the surrounding hot combustion gases without the further addition of any substantial amount of air, and separating said carbon black from the resultant gaseous products of said process.

29. A process for producing carbon black having high reinforcing properties in rubber similar to those of channel black which comprises continuously introducing fuel and free-oxygen containing gas tangentially into a first cylindrical zone having a diameter greater than its length, passing the resulting gases spirally inward toward the longitudinal axis of said first zone, continuously passing said gases while so rotating into a second cylindrical zone the length of which is greater than its diameter and the radius of which is less than the radius of said first cylindrical zone by a distance greater than the radial extent of said tangential introduction of fuel into said first cylindrical zone, said second zone being in communication with and in axial alignment with said first zone whereby a helical movement of said gases is provided along the inner surface of said second zone, introducing a vaporous hydrocarbon along the axis of said first zone and passing it axially through the center of said inwardly spiralling gases in said first zone and axially into the center of said helically moving gases in said second zone, burning said fuel with said free-oxygen containing gas and substantially completing the combustion of said fuel before said inwardly spiralling resulting gases contact said axially passing vaporous hydrocarbon to maintain a temperature above approximately 2600° F. in said first cylindrical zone, forming carbon black from said vaporous hydrocarbon by pyro-chemical action due to the heat of the surrounding hot combustion gases without the further addition of any substantial amount of air, and separating said carbon black from the resultant gaseous products of said process.

JOSEPH C. KREJCI.

REFERENCES CITED

The following references are of record in the file of this patent:

UNITED STATES PATENTS

| Number | Name | Date |
| --- | --- | --- |
| 1,364,273 | Gerard et al. | Jan. 4, 1921 |
| 1,669,618 | Lewis | May 15, 1928 |
| 1,892,534 | Rembert | Dec. 27, 1932 |
| 1,909,163 | Brownlee | May 16, 1933 |
| 2,039,981 | Rembert | May 5, 1936 |
| 2,292,355 | Ayers | Aug. 11, 1942 |
| 2,368,827 | Hanson et al. | Feb. 6, 1945 |
| 2,368,828 | Hanson et al. | Feb. 6, 1945 |
| 2,375,795 | Krejci | May 15, 1945 |
| 2,419,565 | Krejci | Apr. 29, 1947 |

Certificate of Correction

Patent No. 2,564,700

August 21, 1951

JOSEPH C. KREJCI

It is hereby certified that error appears in the printed specification of the above numbered patent requiring correction as follows:

Column 14, line 1, for "spirally" read *spiralling*; column 16, line 49, for "pyyro-chem-" read *pyro-chem-*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*